July 11, 1961 N. M. EMSLIE ET AL 2,991,920

TAPE HANDLING APPARATUS

Filed Aug. 21, 1957

INVENTORS
NORMAN M. EMSLIE
BURNHAM E. STONE

BY Carl H. Sysmatovell [signature]

AGENT

United States Patent Office 2,991,920

Patented July 11, 1961

2,991,920

TAPE HANDLING APPARATUS

Norman M. Emslie, Yardley, and Burnham E. Stone, Levittown, Pa., assignors to Philco Corporation, Philadelphia, Pa., a corporation of Pennsylvania Filed Aug. 21, 1957, Ser. No. 679,337
2 Claims. (Cl. 226—118)

The present invention has to do with tape handling apparatus. While of broader applicability, apparatus of the present invention has particular utility in the art of magnetic recording and reproducing equipment utilizing a ribbon or tape as a record medium.

Apparatus of the general type with which the present invention is concerned is well known in the art. Such apparatus may, for example, be provided for manipulation of magnetic tape which serves as a memory medium for computers, and in such an application it is known to handle tapes hundreds of feet in length, and propelled many feet per second past suitable recording and reproducing head means. Storage of the aforementioned tape takes the general form of random layers, disposed in a serpentine manner, extending transverse a magazine storage bin, and difficulties have been encountered in arriving at suitable means for guiding tape so disposed, particularly in view of the necessity of avoiding kinks or twists in the tape. Also, in the computer art, random predetermined portions of the recording medium, for example tape, must be quickly accessible to the reproducing head; it is desirable that "access time" be kept at a minimum.

It is the broad object of the present invention to provide apparatus meeting the foregoing requirements.

With more particularity it is the primary object of the present invention to provide apparatus adapted to bin-store tape without the formation of kinks or twists, and to move the tape in either a forward or a reverse direction through the bin in such fashion as to minimize access time.

In the achievement of the foregoing and other objectives, a preferred embodiment of the present invention comprises means for moving an endless recording tape past suitable head means, in combination with means for storing the tape in random serpentine layers, said last mentioned means including conveyor means disposed to contact the mentioned layers whereby movement of the aforesaid layers in the direction of tape travel is promoted.

It is an important feature of the present invention that the novel construction and arrangement of the tape storage means promotes tape movement to and from surface layers of the stored tape.

It is to be understood that although but a single head means is shown in the apparatus illustrated by way of example, any desired number or combination of recording, reproducing, and erasing head means is contemplated, particularly in view of the novel apparatus hereinafter disclosed which advantageously provides tape drive in either direction.

In the accompanying drawing forming a part of this specification, and in which like numerals are employed to designate like parts:

Figure 2:
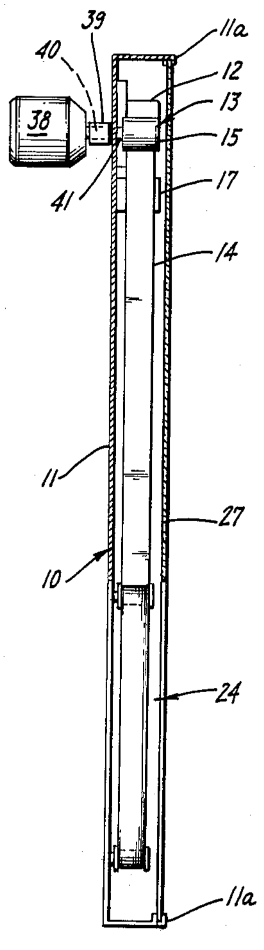
FIGURE 2 is a side elevation partly in section, of the apparatus illustrated in FIGURE 1.
Figure 1:
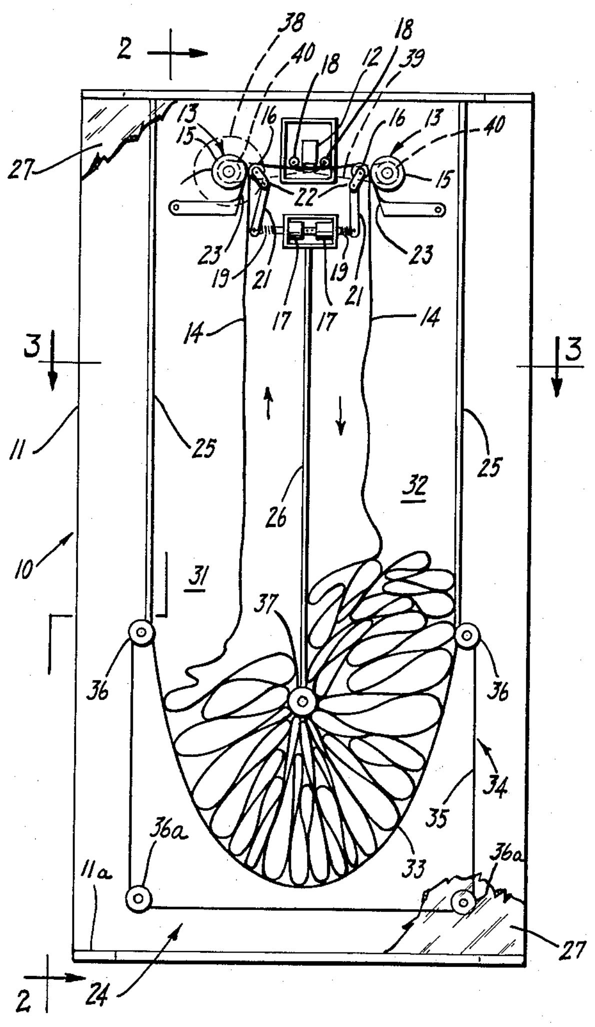
FIGURE 1 is a front elevational view, with parts broken away, of tape and storage apparatus embodying the principles of the present invention.

Now making more particular reference to the drawing, and as best seen in FIGURE 1 thereof, the present invention is embodied in endless tape magazine structure preferably of the type utilized as a memory medium for electrical computing equipment (not shown). With reference to FIGURE 2, a frame means 10 is seen to comprise a vertically extending wall structure 11 which serves as a support plate for combined recording-reproducing head means 12. Also disposed in the upper region of support plate, or wall structure 11 are a pair of drive pulley means 13 so constructed and arranged as to drive tape 14 past the aforementioned head means 12. Suitable means provided for driving pulley means 13 includes a motor 38 adapted to drive pulleys 15 simultaneously, and each in opposite directions, by means of a suitable cross-belt 39 disposed in driving relation with suitably formed portions 40 of the pulley drive shafts 41. The tape illustrated may be of any known type suitable for magnetic recording, an example being a tape comprising a flexible non-metallic body portion suitably treated whereby to exhibit the desired magnetic properties. A material known commercially as "Mylar," a polyester film, has been found suitable for the aforementioned body portion. Such tape suitable for handling by the apparatus to be hereinafter more fully described may be one inch wide, and one and one half mils thick, whereby to exhibit such desirable properties as substantial lateral rigidity and the capability of being folded upon itself without fouling, whereby to produce compact layers.

Pulley means 13 are of the well known pinch-drive variety and include a drive pulley 15 and resiliently urged pressure roller means 16. A pair of such drive means is shown, each of the illustrated pressure roller means 16 being engageable with the tape 14 whereby the latter may be frictionally driven in either direction, the selected roller means 16 forcing the tape against the appropriate driving pulley 15 to provide the desired direction of tape movement. A pair of selectively actuatable electrical solenoid means 17 are resiliently linked, as seen at 19, to lever arms 21, the latter being pivotally mounted as seen at 22 and adapted to actuate the pressure roller means 16 in order selectively to provide the required driving engagement with each pulley 15.

Additional guide means for the tape 14 includes vacuum-pull means 18 of known type suitably disposed on either side of the reproducing head 12 and providing proper spaced relation of the recording tape with respect to the reproducing head. Suitable deflector means 23 are provided adjacent the discharge portion of each pinch-drive means 13 to insure disengagement of the tape 14 from the drive pulleys 15, as it is fed therefrom, and passage of the tape into the underlying generally U-shaped storage bin 24. The aforementioned storage bin 24 is defined, in part, in cooperation with support plate 11, by a centrally disposed flange 26, a pair of flanges 25 disposed to either side thereof, each of said flanges extending vertically along and outwardly from wall or support plate 11, and a second vertically extending wall or plate 27 (see FIGURE 2) overlying the flanges. The construction and arrangement of the storage bin permits limited lateral movement of the recording tape, while accommodating "layering" of the tape as it is fed into the bin for storage. Wall 27 may be of either opaque or transparent material, and preferably, although not necessarily, is detachably mounted; for example upturned flanges 11*a* provided at the top and bottom of wall 11 accommodate sliding insertion and removal of the wall 27. In order to facilitate illustration of the present invention, this wall has been shown fragmentarily in FIGURE 1, and is best seen in FIGURE 2. With particularity, flanges 25 and 26, in cooperation with support plate 11 and wall 27, form the upper portions 31 and 32 of tape storage bin 24, and while the apparatus thus far described is well known in the art, it is emphasized that difficulties have been encountered in use of such equipment, while handling tapes propelled many feet per second, particularly in view of the necessity of avoiding kinks or twists in the tape.

In particular accordance with the present invention, the foregoing difficulties have been overcome by providing movable means to support the stored tape. This means advantageously takes the form of a movable lower wall portion 33 for the storage bin, said wall portion forming a part of conveyor means, generally designated by numeral 34.

As best seen in FIGURE 1, the conveyor means 34 comprises an endless flexible belt or tape 35 supported by suitable means comprising pulleys 36, **36*a*. Preferably the upper pulleys 36 are disposed in substantial tangential relation to, and slightly below the lower end portion of flanges 25; the lower pulleys 36*a* are preferably disposed directly below pulleys 36. The flexible belt 35 is strung over the pulley means in such manner that a portion depends from the upper pulleys 36, whereby to form the mentioned lower wall portion 33 of the storage bin; a synthetic plastic having such desirable characteristics as relatively low mass coupled with a substantial degree of flexibility and lateral stability, and known commercially as "Teflon," has been found suitable for use as the conveyor belt; in the present embodiment belt 35** is preferably one inch wide and .002 inch thick.

Pulleys 36, and **36*a* are preferably of the idler type rotatably mounted upon "frictionless" bearings of known design, thereby accommodating movement of endless conveyor tape 35 to be hereinafter described. Additional means for accommodating movement of the stored tape 14 comprises an idler puller 37 disposed adjacent the lower end of the centrally disposed flange 26, said pulley 37 being mounted in a manner similar to pulleys 36 and 36*a*** and forming an arcuate upper wall means of the lower loop portion of the storage bin.

In the operation of the novel apparatus comprising the present invention, and as best seen in FIGURE 1, the tape drive means 13 is seen conditioned to drive recording tape 14 in the direction indicated by arrows. The construction and arrangement of conveyor means 34 is such that the tape 14 first stores itself in serpentine loops upon the conveyor belt 35, followed by additional storage of the tape in bin portion 32. As the storage level of the tape 14 rises in bin portion 32 the mass of the stored tape becomes sufficient to initiate and maintain movement of the belt 35 over the pulleys by virtue of the frictional drag of the tape 14 on the belt. Thus a continuous head of stored tape is provided which is effective to accommodate movement of the conveyor means whereby the serpentine loops move in the direction of tape travel. As the loops move in the arcuate path defined by the conveyor means 34, it is seen that the upper portion of these loops adjacent pulley 37 turn in a relatively small radius as compared with the larger turning radius of the lower loop portions. Construction and arrangement of idler pulley 37 is such that it advantageously maintains contact with these loops thereby promoting relatively frictionless movement of upper loop portions of the mass of stored tape in its arcuate path of travel. While promoting movement of the stored tape, idler pulley 37 sufficiently restrains the upper ends of the looped tape portions to ensure that the latter move substantially frontally with the conveyor means 34, whereby the looped portions are presented upwardly toward the tape drive means.

In order to reverse the direction of tape travel the right hand pinch-drive is disengaged and the left pinch-drive engaged, and the tape begins moving immediately from the right hand storage bin 32 to the left hand bin 31. Initially, the conveyor means 34 may continue in the opposite direction; however, the ensuing build-up of tape 14 in the left hand bin portion 31, in combination with a decrease in the height of the tape stored in the portion 32 will effect reversal of the conveyor means 34, followed by continued movement of the latter in response to the weight of the tape being stored.

Figure 3:
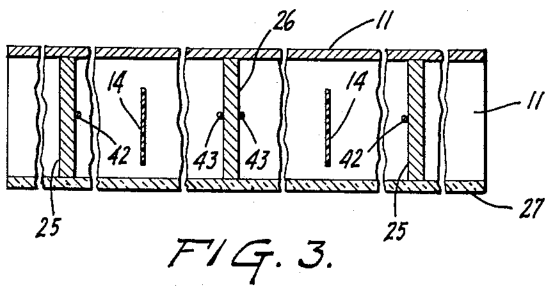
FIGURE 3 is a fragmentary view looking generally in the direction 3—3 of FIGURE 1, and showing a modification thereof.

High speed handling of the magnetic tape, for example under certain climatic conditions, may be accompanied by difficulties arising from static electricity produced in the tape. This may result in a tendency for the tape to adhere to wall members of the storage bin, thereby impeding tape movement through the storage bin. In accordance with the modification shown in FIGURE 3, in order to reduce the friction between the tape and flanges 25 and 26, thereby insuring substantially static free operation of the tape handling means, suitably formed beads 42 and 43 may be provided on the surfaces of flanges 25 and 26, respectively, for contacting the tape 14. For example, the beads illustrated comprise $\frac{1}{16}$ inch diameter wires suitably attached to and extending along central surface portions of flanges 25 and 26. Thus, by minimizing production of static electricity caused by the tape moving at high speeds against the flanges 25 and 26, any possible adherence problem is eliminated.

In view of the novel apparatus hereinbefore described, it will now be understood that tape drive in either direction may be accommodated instantaneously; also, trouble free tape feed at relatively high speeds is achieved particularly in view of the novel conveyor means so constructed and arranged as to provide tape feed, in either direction, from upper portions of the stored tape, rather than from underlying portions thereof. By feeding from upper layers, undue strain upon the tape as well as the drive means is also advantageously avoided inasmuch as the driving force at any instant need only overcome the weight of the non-looped tape portions extending downwardly from the drive means.

Although but a single embodiment of the present invention has been described, it is to be understood that modifications may be made in the apparatus without departing from the scope of the appended claims. For example, one or more of the conveyor idler pulleys may be replaced with driven pulley means should it prove desirable. Also, recording tape drive means other than the pinch-drive may be used.

We claim:

1. In magnetic recording and reproducing apparatus, means for handling an endless recording tape, comprising: vertically extending parallelly disposed wall means; a pair of tape drive roller means disposed in an upper portion of one of said wall means and selectively operable to provide either forward or reverse drive of such tape, the axes of said roller means extending transverse said wall means, endless tape to be driven having a portion disposed and adapted for drive by said roller means past magnetic head means and extending from one to the other of said roller means, and a looped portion depending from said roller means; an endless conveyor belt; and rollers provided on one of said wall means and across which said tape is movable, said belt having a loop portion depending between said rollers positioned and adapted to contact and support said depending looped portion of the tape means and movable with the latter in the driven direction thereof.

2. Magnetic recording and reproducing apparatus, comprising: an endless loop of magnetic tape; magnetic head means; a pair of tape drive roller means each disposed to opposite sides of, and selectively adapted reversibly to drive said tape past, said head means, a portion of said tape loop depending from said roller means; a tape storage bin including a generally U-shaped chamber having a pair of upwardly presented portions of substantially uniform height, accommodating drive of said tape in forward and reverse directions and disposed in open communication with a lower loop portion within which the said depending tape loop portion is normally stored in random layers, the drive of said tape by said roller means being at a rate insuring storage of tape at a higher level in one upwardly presented portion of the U-shaped chamber than in the other such portion; and an arcuate conveyor belt extending through the lower loop portion of said chamber disposed to support the tape stored in said portion and movable, in response to the differential in height of the stored tape, to move the supported layers thereof in the direction of movement imparted to the tape by the reversible tape drive means.

References Cited in the file of this patent

UNITED STATES PATENTS

| | | |
|---|---|---|
| 1,246,993 | Payet | Nov. 20, 1917 |
| 1,296,476 | Burnett | Mar. 4, 1919 |
| 2,482,497 | Miller | Sept. 20, 1949 |

FOREIGN PATENTS

| | | |
|---|---|---|
| 153,064 | Australia | Sept. 2, 1953 |
| 16,731 | Great Britain | of 1899 |